No. 768,692. PATENTED AUG. 30, 1904.
P. PROVOST.
APPARATUS FOR STEAMING GRAIN.
APPLICATION FILED FEB. 18, 1904.
NO MODEL. 2 SHEETS—SHEET 1.
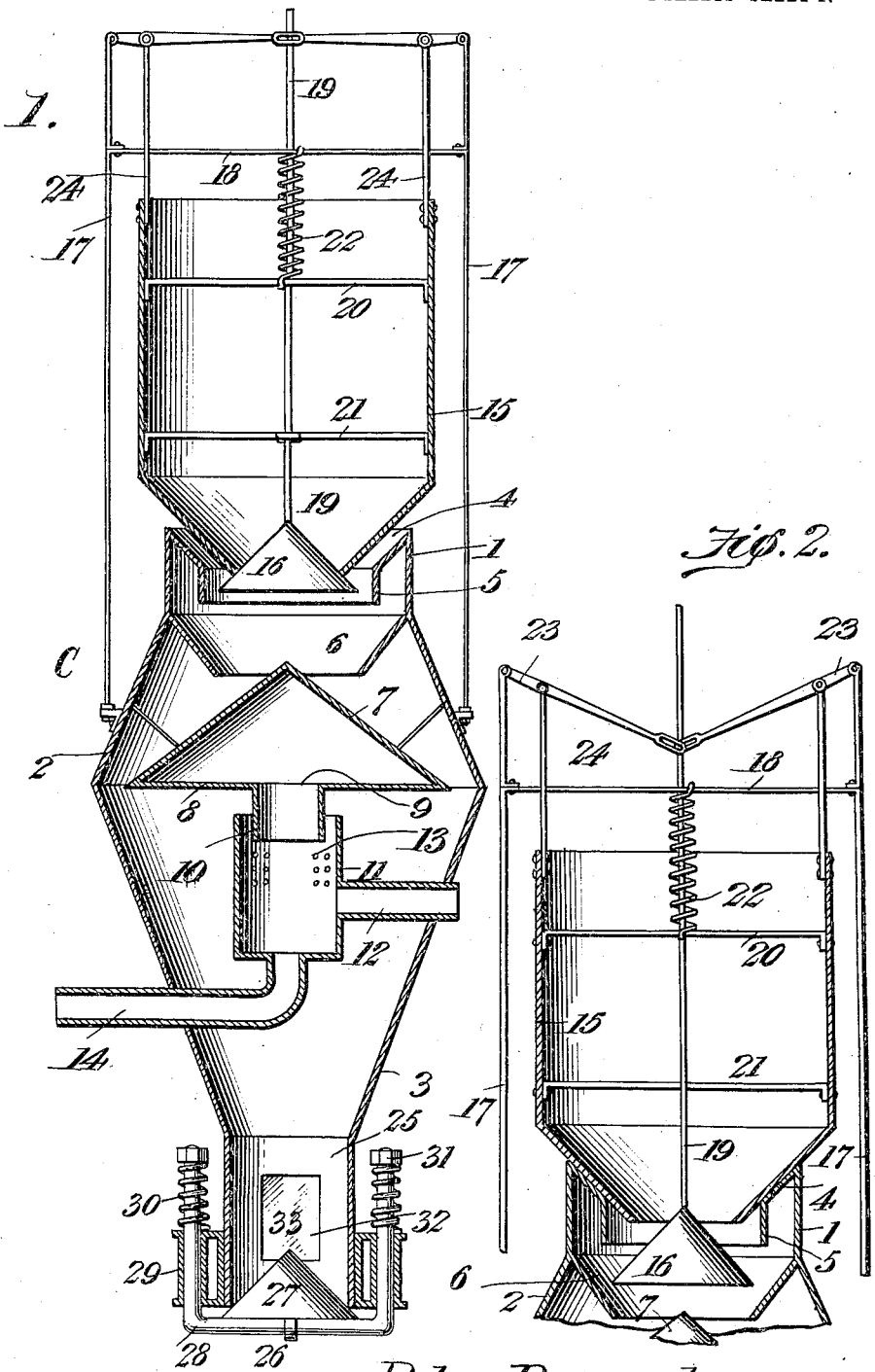
Witnesses
E. W. Stewart
Baxter Morton
Peter Provost Inventor
by C. A. Snow & Co.
Attorneys No. 768,692. PATENTED AUG. 30, 1904.
P. PROVOST.
APPARATUS FOR STEAMING GRAIN.
APPLICATION FILED FEB. 18, 1904.
NO MODEL. 2 SHEETS—SHEET 2.
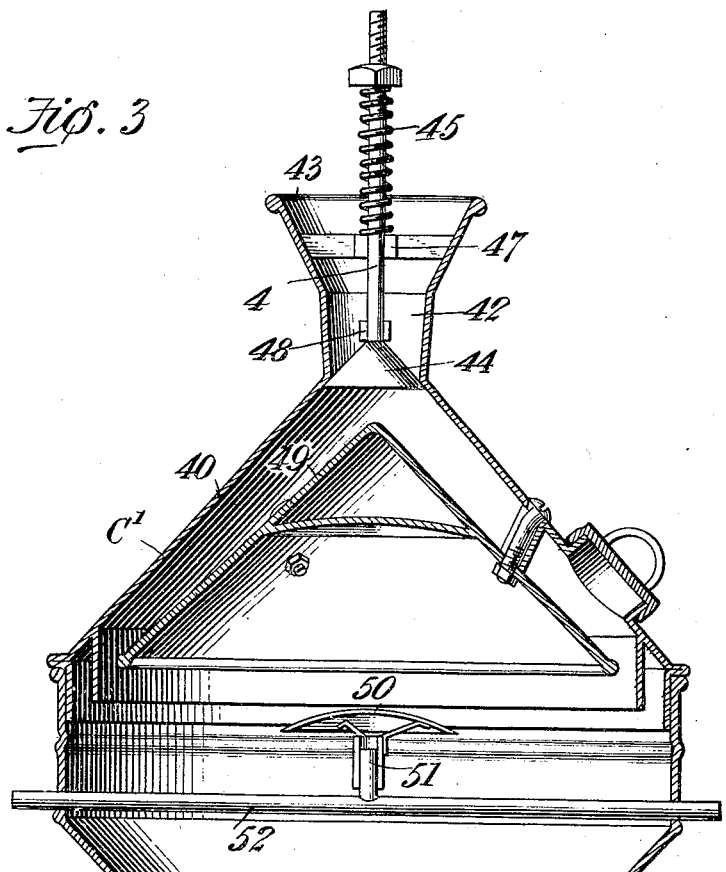
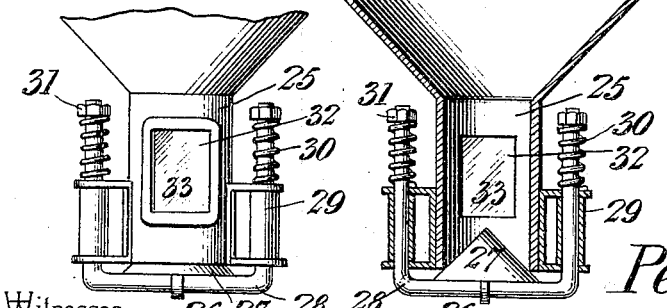

No. 768,692. Patented August 30, 1904.

UNITED STATES PATENT OFFICE.

PETER PROVOST, OF MENOMINEE, MICHIGAN.

APPARATUS FOR STEAMING GRAIN.

SPECIFICATION forming part of Letters Patent No. 768,692, dated August 30, 1904.

Application filed February 18, 1904. Serial No. 194,284. (No model.)

*To all whom it may concern:*

Be it known that I, PETER PROVOST, a citizen of the United States, residing at Menominee, in the county of Menominee and State of Michigan, have invented a new and useful Apparatus for Steaming Grain, of which the following is a specification.

This invention relates to apparatus for steaming grain; and it consists in certain improvements upon the apparatus for steaming grain for which Letters Patent No. 741,831 were granted to me under date of October 20, 1903.

The principal object of the present invention is to provide in a wheat-steamer improved devices for heating the grain and bringing the steam into contact with the grain, thereby to secure more rapid action of the steamer and economy in the use of steam.

A further object of the invention is to provide a wheat-steamer in which the rate of feed of the grain into the apparatus is determined by the quantity of grain in the feeder.

A further object of the invention is to provide in connection with the means for supplying steam to a wheat-steaming apparatus suitable means for removing condensed steam from the apparatus, so as to prevent the condensed steam from forming a film of water over the husks of the grain.

A still further object of the invention is to provide an improved discharge-valve and outlet-tube at the bottom of the steamer, the tube being provided at one side with an inset piece of transparent material, by means of which the height of the grain in the discharge-tube may be kept in view.

In attaining the objects above mentioned I preferably make use of the apparatus hereinafter fully described and claimed, and illustrated in a preferred form of embodiment in the accompanying drawings, it being understood that various changes in the form, proportions, and exact mode of assemblage of the elements exhibited may be resorted to without departing from the spirit of the invention or sacrificing the advantages thereof.

In the drawings, Figure 1 is a view in vertical section through the complete apparatus. Fig. 2 is a detail view showing the operation of the feeder. Fig. 3 is a view in vertical section through a modified form of the apparatus. Fig. 4 is a view in elevation of the discharge-tube and escape-valve at the bottom of the discharge-tube.

Referring to the drawings, in which corresponding parts are designated by similar characters of reference throughout the several views, C designates the casing of the steamer proper, and the casing consists, preferably, of three sections, as shown. The upper section 1 of the casing is cylindrical in form and is mounted at the top of the intermediate section 2, which is preferably in the form of a frustum of a cone. The lower section 3 is in the form of an inverted frustum of a cone and tapers to a smaller diameter than the intermediate section. At the top of the section 1 of the casing C there is provided a conical guide member 4, at the bottom of which is attached a tubular extension 5, and at the juncture of the upper section 1 of the casing with the intermediate section 2 a second conical guide member 6 is provided.

The grain to be steamed enters the casing at the top, passes downward through the guide members 4 and 6, and falls upon the sloping surface of a conical spreader 7. The spreader is a conical shell having a base 8 provided with a central opening 9, through which steam is admitted to the interior of the shell. A tube 10 is attached to the base 8 and extends downward therefrom for a short distance, telescoping with the terminal 11 of a steam-supply pipe 12, which enters the casing through the opening in the lower section 3. The base of the spreader 7 lies substantially in the plane of juncture of the intermediate section 2 of the casing with the lower section 3, and the apex of the spreader projects upward through the opening left at the bottom of the conical guide member 6 for the passage of the grain.

The terminal 11 of the steam-supply pipe is preferably cylindrical in form, as shown, and is of somewhat larger diameter than the tube 10, extending downward from the base of the conical spreader 7, thus affording an annular passage between the tube 10 and the wall of the terminal 11 of the steam-pipe for the escape of the steam beneath the base of the spreader. The terminal member 11 is preferably provided above the point at which the steam-pipe enters the said terminal member with a plurality of perforations 13 in order that sufficient provision may be made for the escape of steam into the lower section 3 of the casing. At the bottom of the terminal member 11 of the steam-pipe an exhaust-pipe 14 is attached, which extends out through the side of the casing to remove from the terminal member 11 any water of condensation which may be formed therein.

A suitable valve is provided at the bottom of the casing C to prevent the escape of steam at the bottom of the casing and to permit the escape of the steamed grain at a rate proportional to the rate of entry of the grain into the steaming apparatus.

The operation of the apparatus, as above described, upon the grain passing through it will be readily understood from the description and the drawings accompanying the specification. As the grain passes downward from the top of the casing and falls upon the spreader 7 it will of course spread into a thin sheet or layer as it nears the base of the spreader and passes over the margin thereof. As the margin of the spreader is very near the wall of the casing, the grain will be subjected to the full effect of the steam as it passes from the spreader into the lower section 3 of the casing. Before the grain passes off the spreader and encounters the steam which rises at the margin of the spreader it will be thoroughly heated by passing over the surface of the spreader, and consequently by the time the grain is exposed to the direct action of the steam the grain will have been heated to such a temperature that the steam will not be condensed by contact with the surface of the grain, but will penetrate the outer husk of the grain and soften the layer of gluten between the husk and the kernel.

The thorough heating effect of the spreader upon the grain is insured by the arrangement of the spreader and the terminal of the steam-supply pipe. The spreader having the bottom thereof closed except at the opening 9, which is directly over the terminal of the steam-supply pipe, and having the tube 10 extended down into the said terminal of the supply-pipe necessarily receives a considerable portion of the steam which enters through the steam-supply pipe, and the steam entering the hollow conical spreader and being confined therein keeps the spreader heated to a temperature sufficiently high to insure thorough heating of the grain as it passes over the upper surface of the spreader. When the spreader consists merely of a conical member having the base wholly open to discharge the steam beneath the spreader, even though the orifice through which the steam is discharged be near the apex of the spreader, as shown in my prior patent above mentioned, the heating effect of the steam upon the spreader is less pronounced, and the grain is not so effectively heated with a given quantity of steam as when the spreader is constructed in the manner above described.

The water formed by condensation of steam within the hollow spreader escapes through the tube 10, surrounding the opening 9, and drips into the terminal 11 of the steam-supply pipe, from which it escapes through the exhaust-pipe 14, extending outward from the casing-wall. This mode of removing the water of condensation from the casing is decidedly preferable to allowing the water of condensation to drip from the margin of the spreader upon the grain in the lower chamber in the usual manner, as it is undesirable that the surface of the grain be coated with a film of water when it emerges from the steaming apparatus.

In order to provide for the automatic feed of the grain into the casing at a rate proportional to the supply of grain to the feeding apparatus, I make use of a feeder comprising a receptacle 15, having a valve 16 at the bottom thereof and suitably supported by means of standards 17, rising from the casing-wall, and a cross-bar 18, mounted on the upper ends of said standards. The receptacle 15 is provided with a frusto-conical bottom having a central opening, as shown, and the valve 16 is a conical member arranged in the opening in the bottom of the receptacle. The valve 16 is attached to the rod 19, which extends upward through openings provided therefor in cross-bars 20 and 21, arranged in the receptacle 15. A spring 22 is arranged between the upper cross-bar 20 in the receptacle and the cross-bar 18, carried by the standards 17. This spring is of such proportions that it keeps the receptacle 15 normally at a slight distance above the conical guide member 4 at the top of the steamer-casing; but when the receptacle contains wheat it is depressed, and when the receptacle contains a full charge of wheat the bottom of the receptacle rests upon the guide member 4. The valve 16 is operated by the movement of the receptacle, and the means preferably employed for controlling the valve consists of levers 23, mounted on the cross-bar 18 and pivotally connected with the valve-rod 19 at their free ends. Suitable connections 24 are provided between the levers 23 and the receptacle 15, being attached to the levers 23 between their free ends and their fulcrums, so that the downward movement of the receptacle under the influence of a larger amount of grain will impart to the valve, through the levers 23 and connections 24, a downward movement of greater magnitude, thus increasing the rate at which grain is fed to the casing.

From the foregoing description it will be seen that the weight of the grain in the casing is operative to open the valve, and no interference with the action of the valve can be occasioned by clogging at the bottom of the casing, as sometimes occurs when the pressure of the grain upon the upper surface of the valve is the means of opening the valve.

In order to provide means for controlling the period during which the grain is subjected to the action of steam within the apparatus, I preferably provide at the bottom of the casing C a discharge-tube 25, having at its lower end a valve (designated generally as 26) to control the rate of escape of the grain from the casing. The preferred form of valve and supporting mechanism includes the conical valve proper, 27, and a rod 28, bent into U shape and having the side portions thereof extended vertically upward through guide-openings formed in lugs 29, provided at opposite sides of the tube 25. The ends of the rod 28, which project above the lugs 29, are threaded and extend through coil-springs 30, whose tension may be adjusted by means of thumb-nuts 31 upon the threaded ends of the rod. By means of the thumb-nuts mounted upon the valve-supporting rod 28 it is possible to adjust the tension of the springs surrounding the end portions of the rod, so that the escape of grain from the casing shall begin when the grain has accumulated to any desired depth in the discharge-tube. The adjustment of the springs 30 to determine the depth to which grain must accumulate in the discharge-tube before the valve will be depressed is greatly facilitated by means of a view-aperture 32, provided in the discharge-pipe and having a piece of glass 33 or other transparent material fitted therein.

In the operation of the complete apparatus as above described the thumb-nuts 31 will ordinarily be so adjusted upon the ends of the valve-supporting rod 28 that grain must accumulate in the discharge-tube until its level is about midway between the upper and lower ends of the view-aperture. If, however, it is desired to increase the period of action of the steam upon the grain in the apparatus, the tension of the spring 30 may be increased, or if a shorter exposure to the steam is desired the tension of the springs may be decreased and the opening of the valve effected before the grain has accumulated in such amount within the discharge-tube.

While it is intended that the complete device shall embody therein all of the features of construction above described, it is perfectly feasible to make use of a discharge-valve of the character disclosed in connection with steaming apparatus of somewhat different character. In Figs. 3 and 4 I have illustrated the application of the discharge-valve to a steamer of different construction.

Referring to Figs. 3 and 4, C' designates the casing of the steamer, which is composed of an upper conical section 40 and a lower conical section 41, the two sections being reversely disposed and by preference separably connected, as shown. At the top of the upper section 40 I provide an inlet-tube 42, having a receiving-cone 43 at its upper end and provided with an adjustable conical inlet-valve 44, which is normally held in closed position by means of a spring 45, surrounding the valve-stem 46. The spring is supported upon a transverse bar 47 near the top of the receiving-cone, and the bar 47 and another transverse bar 48, arranged in the inlet-tube, are provided with apertures to guide the reciprocations of the valve-stem. Below the valve 44 I provide a conical grain-spreader 49, whose periphery is disposed in close proximity with the upper section 40 of the casing. Below the spreader 49 and arranged slightly below the plane of the top of the lower section 41 of the casing is a steam-deflector 50, presenting a lower concave surface, which is disposed above and spaced a slight distance from the vertical terminal 51 of a steam-pipe 52, which extends horizontally through the casing from side to side and has one end thereof closed to cause the steam to escape wholly through the vertical terminal branch.

At the bottom of the steaming apparatus, as described in the foregoing paragraph, an outlet-tube and discharge-valve of precisely the same construction as those already described are provided, and as the discharge-valve and view-aperture operate in precisely the same manner as those described above a further description thereof appears to be unnecessary.

When it is desired to obtain a prolonged action of the steam upon the grain, so that the grain may become thoroughly heated in passing through the apparatus, it is necessary to provide some form of valve to control the rate of discharge of the grain from the casing at its lower end. When, however, such prolongation of the action of the apparatus upon the grain is unnecessary, the discharge-valve at the bottom of the apparatus may be dispensed with, and the action of the feeder and steam-supply and removal devices (shown in Fig. 1) take place as described.

Having thus described the construction and operation of my invention, what I claim as new, and desire to secure by Letters Patent, is—

1. In a grain-steaming apparatus, a steamer-casing, standards supported by and extending upwardly from the same, a cross-bar connecting said standards, a receptacle, a spring whereby said receptacle is yieldably suspended from said cross-bar, a conical valve seated in the opening in the bottom of the receptacle, a stem extending upwardly from said valve through the suspending-spring, levers fulcrumed upon the upper ends of the standards and having pivotal connection with the valve-stem, and links connecting said levers with the receptacle.

2. In a grain-steaming apparatus, a feeder comprising a movably-supported receptacle, a valve constituting a closure for the bottom of said receptacle, an upwardly-extending stem supporting said valve, a pair of independently-supported levers, links connected with said levers relatively near their fulcra, and means connecting the valve-stem with said levers at points distant from their fulcra, whereby the descent of the receptacle produces a greater descent of the valve.

3. In a grain-steaming apparatus, a discharge-tube provided on opposite sides thereof with outwardly-projecting guide-lugs, a U-shaped yoke constituting a valve-supporting member having the side portions thereof slidably mounted within said guide-lugs, supporting-springs coiled upon the side portions of said yoke and bearing against the upper sides of the guide-lugs, spring-tightening nuts upon the upper ends of the side pieces of said yoke, and a conical valve supported directly upon and connected with the supporting member between the side arms of the latter by means of a loop, surrounding the body of said supporting member.

In testimony that I claim the foregoing as my own I have hereto affixed my signature in the presence of two witnesses.

PETER PROVOST.

Witnesses:
 WM. HOLMES,
 GERTRUDE MURRAY.